INVENTOR.
WILSON A. CHARBONNEAUX
BY *Alfred W Petchaft*
ATTORNEY

*INVENTOR.*
WILSON A. CHARBONNEAUX
BY Alfred W. Petchaft
ATTORNEY

July 7, 1959 W. A. CHARBONNEAUX 2,894,191
SPEED CONTROL FOR ALTERNATING-CURRENT INDUCTION MOTORS
Filed May 27, 1957 3 Sheets-Sheet 3

INVENTOR.
WILSON A. CHARBONNEAUX
BY
ATTORNEY

United States Patent Office 2,894,191
Patented July 7, 1959

2,894,191

SPEED CONTROL FOR ALTERNATING-CURRENT INDUCTION MOTORS

Wilson A. Charbonneaux, Dayton, Ohio, assignor to WacLine, Inc., Dayton, Ohio, a corporation of Ohio Application May 27, 1957, Serial No. 661,869

8 Claims. (Cl. 318—229)

This invention relates to speed controls for electric motors and more particularly to speed controls for alternating-current motors.

A principal object of the invention is to provide a method of speed control for alternating-current motors of the induction type which is sensitive and quickly responsive to fluctuation in speed due to torque or load changes on the motor, thereby achieving close maintenance of speed at all times.

Another object of the invention is to provide a speed control for polyphase alternating-current motors of the induction type which will maintain the speed of the motor at a preselected value over a comparatively wide variation in torque output of the motor.

Still another object of the invention is to provide a speed control for polyphase alternating-current motors of the induction type whereby the torque capability of the motor is maintained substantially constant over a wide range of speed.

And still another object of the invention is to provide a speed control for polyphase alternating-current motors of the induction type which is economical of manufacture, efficient in use, and which may be serviced by personnel of limited training and experience.

Broadly, the present invention utilizes a multi-pole tachometer generator, the rotating element of which is mechanically connected to the rotating element of a motor, the speed of which is to be controlled. The alternating-current voltage produced by such a generator is a function of its speed, and the value of this voltage at any instant is indicative of the speed of the generator, and, consequently, of the speed of the motor. The alternating voltage is rectified in a suitable rectifier, and this rectified voltage is balanced against a preselected reference voltage so that any variation in the speed of the motor will produce a differential voltage which is applied in a regulating circuit to reactor means in series with the motor windings, whereby the speed of the motor is maintained substantially constant.

Referring now to the drawings in which—

Figure 1:
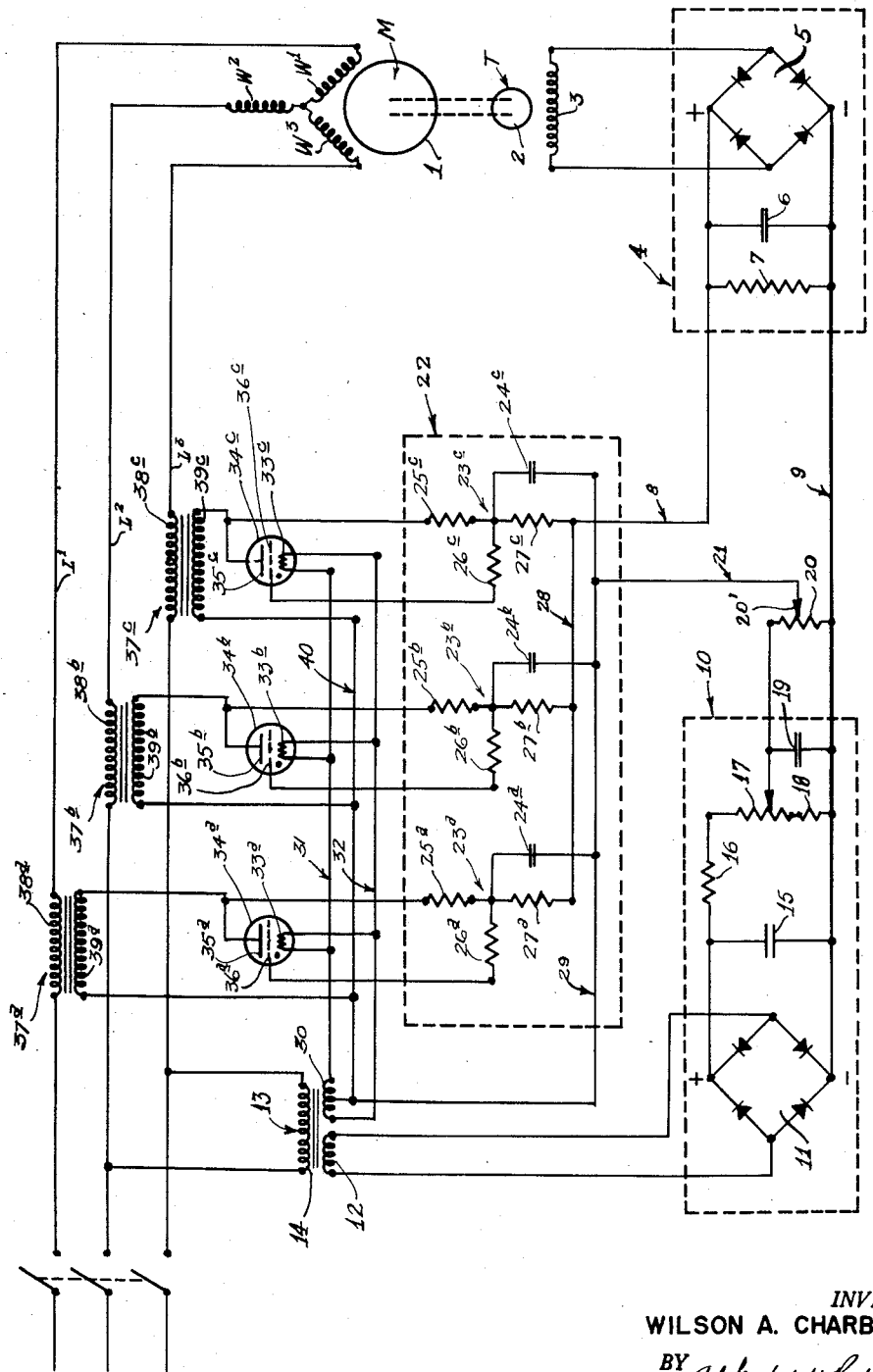
Fig. 1 is a diagrammatic view of a speed control constructed in accordance with and embodying the present invention.

The speed control of the present invention is shown diagrammatically in Fig. 1 in association with a motor M having conventional stator windings $W^1$, $W^2$, $W^3$, connected to a rotating member 1 which is mechanically connected to a tachometer generator T. The tachometer generator T may be of any suitable type, but preferably consists of a permanently magnetized rotor 2 having a plurality of poles, such, for example, as twenty-four or thirty-six, operatively mounted for rotation within a stator member having suitable windings 3, so as to generate an alternating-current voltage which is a function of the speed of rotation of the rotor 2 and, consequently, of the speed of the motor M.

The stator winding 3 of the tachometer generator T is connected to a tachometer voltage circuit 4 which consists of a suitable rectifier bridge 5, the output of which is fed to a capacitor 6 and resistor 7, the arrangement being such that a major portion of the ripple in the output voltage is absorbed and a voltage substantially free of ripple is thereby produced which is a function of the tachometer generator T and is imposed across conductors 8, 9.

Also provided for co-operation with the tachometer voltage circuit 4 is a reference voltage circuit 10, which consists of a suitable rectifier bridge 11 supplied with current from one secondary winding 12 of a transformer 13, the primary winding 14 of which is connected across one phase of the three-phase alternating-current supply to the motor M. The rectified output current from the bridge 11 is fed through a filter circuit consisting of a capacitor 15, resistor 16, potentiometer 17, resistor 18, and capacitor 19, the arrangement being such that substantially all the ripple is absorbed and a constant reference voltage is imposed across a control potentiometer 20, which is, in turn, connected to the conductors 9 and 21. Also provided for co-operation with the tachometer voltage circuit 4 and the reference voltage circuit 10 is a phase-shift circuit 22 which consists of three identical networks $23^a$, $23^b$, $23^c$, respectively, including capacitors $24^a$, $24^b$, $24^c$, plate resistors $25^a$, $25^b$, $25^c$, grid resistors $26^a$, $26^b$, $26^c$, and input resistors $27^a$, $27^b$, $27^c$. As will be seen in Fig. 1, one terminal of the capacitor $24^a$, one terminal of the plate resistor $25^a$, one terminal of the grid resistor $26^a$, and one terminal of the input resistor $27^a$, are connected in common. Similarly, one terminal of the capacitor $24^b$ and the resistors $25^b$, $26^b$, $27^b$, are connected in common, and one terminal of the capacitor $24^c$ and the resistors $25^c$, $26^c$, $27^c$, are connected in common. The other terminal of the input resistors $27^a$, $27^b$, $27^c$, are connected through conductor 28 to conductor 8. The other terminals of capacitors $24^a$, $24^b$, $24^c$, are connected in common through conductor 29 to conductor 21 and also to a suitable tap on the other secondary winding 30 of transformer 13. The terminals of this secondary winding 30 are connected through conductors 31, 32, to the filaments $33^a$, $33^b$, $33^c$, of gas-filled grid-controlled electron tubes $34^a$, $34^b$, $34^c$, the latter being respectively associated with the networks $23^a$, $23^b$, $23^c$, of the phase-shift circuit 22. The tubes $34^a$, $34^b$, $34^c$, have plates $35^a$, $35^b$, $35^c$, which are respectively connected to the other terminals of plate resistors $25^a$, $25^b$, $25^c$, and have grids $36^a$, $36^b$, $36^c$, which are respectively connected to the grid resistors $26^a$, $26^b$, $26^c$.

Provided for operation upon the three-phase alternating-current supply to the motor M are three reactors $37^a$, $37^b$, $37^c$, which have primary windings $38^a$, $38^b$, $38^c$, respectively interposed in the supply lines or main conductors as shown in Fig. 1. The reactors $37^a$, $37^b$, $37^c$, also have secondary windings $39^a$, $39^b$, $39^c$, which are connected in common through conductor 40 to the tap of secondary winding 30. The other terminals of secondary windings $39^a$, $39^b$, $39^c$, are respectvely connected to the plates $35^a$, $35^b$, $35^c$, of the electron tubes $34^a$, $34^b$, $34^c$.

The arrangement is such that the plate resistors $25^a$, $25^b$, $25^c$, and capacitors $24^a$, $24^b$, $24^c$, form resistance-capacitance circuits connected across the secondary windings $39^a$, $39^b$, $39^c$, of the reactors $37^a$, $37^b$, $37^c$, respectively, with the result that alternating voltages are impressed on the grid-to-cathode circuits of each of the tubes $34^a$, $34^b$, $34^c$, through the grid resistors $26^a$, $26^b$, $26^c$. Since these alternating voltages are across the capacitors $24^a$, $24^b$, $24^c$, such voltages will be displaced in phase relative to the voltages applied from anode-to-cathode by substantially 90 electrical degrees and each of the tubes $34^a$, $34^b$, $34^c$, will be caused to conduct or to "fire" at approximately the midpoint of each positive cycle of voltage impressed on the respective anode-to-cathode circuits.

The algebraic sum of the rectified tachometer voltage and reference voltage is superimposed on said alternating voltages through input resistors $27^a$, $27^b$, $27^c$, the result being that the alternating voltages ride upon the differential voltage in a manner well understood by those skilled in the art. Should the speed of the motor M be reduced, the tachometer voltage would be reduced proportionately, resulting in the differential voltage becoming less negative, thus causing the tubes $34^a$, $34^b$, $34^c$, to fire earlier in the cycle and so to supply an increased quantity of energy to motor M. Should the speed of the motor M increase above the preselected speed, the differential voltage would become more negative and so delay the firing of tubes $34^a$, $34^b$, $34^c$, thereby decreasing the quantity of energy supplied to the motor. Thus, the speed of motor M may be maintained at any preselected speed.

Obviously, the differential voltage may be amplified by any means which is well known to those skilled in the art, such as, for example, by means of suitable vacuum tubes, and the alternating voltage may be superimposed upon such amplified differential voltage so that very precise speed control can be effected. Likewise, the differential voltage may be modified by any suitable signal, such as that from a data computer so as to cause the speed of motor M to vary in any desired manner. It should also be noted in this connection that the control potentiometer 20 which is connected across the output of the reference voltage circuit is arranged so that any desired portion of the output voltage may be selected by manipulation of the movable arm $20'$ thereof. This potentiometer 20 may be placed in a location remote from both motor and control apparatus, such, for example, as at the operator's station of a machine, so that any desired speed within range of the apparatus may be selected by positioning the movable arm $20'$ of the potentiometer.

When the main switch S is closed, current is supplied to windings $W^1$, $W^2$, $W^3$, of motor M through primary windings $38^a$, $38^b$, $38^c$, of reactors $37^a$, $37^b$, $37^c$. If the grids $36^a$, $36^b$, $36^c$, of electron tubes $34^a$, $34^b$, $34^c$, are biased such that the tubes do not conduct, the voltage drop across the primary winding of each reactor is large, generally in the order of three-fourths of the phase voltage impressed upon each winding, and, consequently, the current drawn therethrough is sufficient to operate the motor at minimum speed. If the grids of tubes $34^a$, $34^b$, $34^c$, are biased so that the tubes conduct, the voltage drop across the reactors is small, usually in the order of 3 to 5 percent of the phase voltage, so that the voltage impressed on the motor windings is large and the motor tends to operate at maximum speed. By causing the tubes $34^a$, $34^b$, $34^c$, to conduct over a greater or lesser part of each cycle of electrical energy supplied, the motor may be operated at any speed between the minimum and maximum speed. The function of the entire control circuit is to cause the tubes $34^a$, $34^b$, $34^c$, to conduct over such portion of each cycle as is required for the motor to operate at any desired speed and to maintain this speed substantially constant by varying the time of conduction of the tubes in response to variations in voltage caused by variation in speed of tachometer T. The control A may be also arranged to vary the speed of the motor M in response to signals from devices such, for example, as photocells or thermocouples and to maintain this speed substantially constant until a change in speed is indicated by a change in applied signal. Further, the speed of the motor M may be varied in any preselected sequence by signals from devices such as magnetic tapes, punched cards or tapes, and the like; or in response to signals from computers, integrators, and the like, all of which generate alternating voltages which can be imposed across conductors 8, 21, in lieu of the algebraic sum of the output voltages from circuits 4 and 10.

If desired, it is possible to employ the control circuit of the present invention with a modified form of reactor 41 comprising a single core 42 having parallel legs $43^a$, $43^b$, $43^c$, respectively, wound with primary windings $44^a$, $44^b$, $44^c$, and secondary windings $45^a$, $45^b$, $45^c$. The primary windings are respectively connected to the supply line and the windings $W^4$, $W^5$, $W^6$, of motor $M'$. Similarly, the secondary windings $45^a$, $45^b$, $45^c$, are connected to electron tubes $46^a$, $46^b$, $46^c$, in the manner shown in Fig. 2, the remaining elements of the control circuit A being substantially the same as previously set forth above and, therefore, being implicit without necessity of separate illustration.

Figure 3:
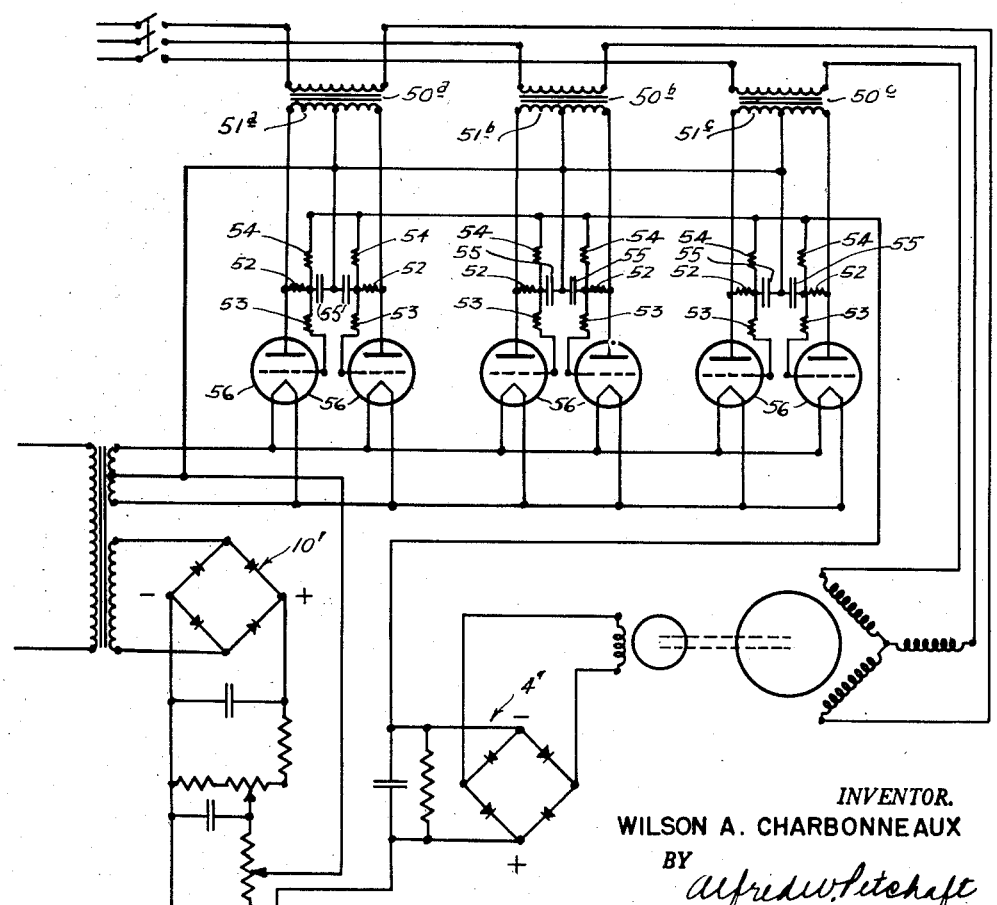
Fig. 3 is a schematic diagram of a further modified form of control circuit embodying the present invention.

It is also possible to provide a modified form of control, as shown diagrammatically in Fig. 3, which comprises three reactors $50^a$, $50^b$, $50^c$, which are interposed in the three-phase supply to the motor. The motor and the three-phase supply therefor, being substantially as heretofore described, are not shown in Fig. 3. The reactors $50^a$, $50^b$, $50^c$, are also provided with secondary windings $51^a$, $51^b$, $51^c$, respectively, which are medially tapped and connected across twin phase-shifting reactor-control networks, each comprising a plate resistor 52, a grid resistor 53, an input resistor 54, a capacitor 55, and a grid-controlled electron tube 56 connected in the same manner and having substantially the same function as the previously described networks $23^a$, $23^b$, $23^c$, of the embodiment shown in Fig. 1. The input resistors 54 are connected by conductor 57 to a tachometer voltage circuit $4'$ and the capacitors 55 are connected by conductor 58 to a reference voltage circuit $10'$, the tachometer voltage circuit $4'$ and reference voltage circuit $10'$ being substantially identical with the previously described tachometer voltage and reference voltage circuits 4, 10, respectively. As will be seen by comparison between Figs. 1 and 3, the two control circuits are substantially similar except for the twinning of the reactor control networks and function upon the same principle except that the control shown in Fig. 3 utilizes the full-wave control of each of the reactors $50^a$, $50^b$, $50^c$.

Figure 2:
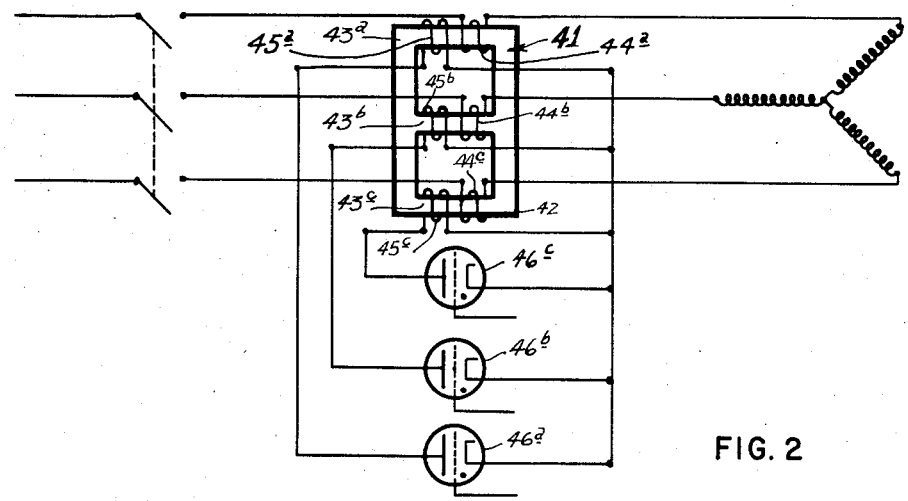
Fig. 2 is a diagrammatic view of a modified form of control device embodying the present invention.
Figure 4:
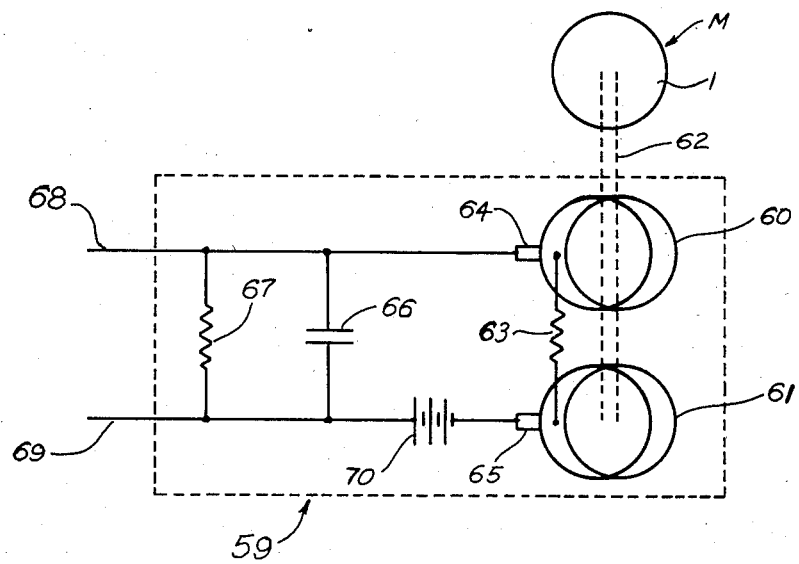
Fig. 4 is a fragmentary schematic diagram of a further modified form of the present invention.

It is also possible to provide a modified form of voltage circuit 59, as shown in Fig. 4, which is responsive to changes in torque of the motor M and may be incorporated into the circuits shown in Figs. 1–3 in lieu of the tachometer voltage circuit 4 previously described. The torque responsive voltage circuit 59 comprises a pair of spaced parallel slip rings 60, 61, each mounted on the motor shaft 62, and a strain gauge 63 is connected between the slip rings 60, 61. Contacting the slip rings 60, 61, are brushes 64, 65, the output of which is fed to a capacitor 66, resistor 67, and conductors 68, 69, all similar to the resistor 6 and capacitor 7, and conductors 8, 9, previously described. A suitable source of direct current 70 supplies current to the circuit 59. Upon changes in torque applied by the motor shaft 62, the slip ring 60 will rotate through a small angle and, similarly, the slip ring 61 will rotate through the same angle but will move through an arc larger or smaller than the arc of rotation of the slip ring 60, depending upon whether or not there is an increase or decrease in torque applied by the motor shaft 62. The rotation of the slip rings 60, 61, will vary the resistance of the strain gauge 63, which will, in turn, apply a voltage across the conductors 68, 69, proportional to change in torque applied by the motor shaft 62. While the torque responsive voltage circuit 59 is shown as utilizing a strain gauge and slip rings, it will be obvious that other types of torque sensing devices known in the art can be embodied in the circuit 59.

While it is apparent that the foregoing description relates to an adjustable speed motor drive, the basic control circuit may be applied to a motor drive in which it is desired to hold the motor speed to a precise fixed value.

It should be understood that changes and modifications in the form, construction, arrangement, and combination of the several parts of the speed control for alternating-current induction motors may be made and substituted for those herein shown and described without departing from the nature and principle of my invention.

Having thus described my invention, what I claim and desire to secure by Letters Patent is:

1. For use with polyphase alternating-current induction motors and the like; control means comprising reactors each having a primary winding and a secondary winding, each primary winding being interposed in one phase of the motor current-supply, means for producing a stable reference voltage, means for producing a sensory voltage, the value of which varies responsive to the variation in speed of the motor means for combining said reference and sensory voltages whereby to produce a control voltage which is the algebraic sum of the reference and sensory voltages, a resistance and a capacitance connected in series with the secondary winding of each reactor, an electron tube means for each reactor, said electron tube means having a plate-to-cathode circuit and a grid-to-cathode circuit, the secondary winding of the reactor associated with the tube means being series connected in the plate-to-cathode circuit, said capacitance being series connected in the grid-to-cathode circuit, and the control voltage being impressed on the grid of each tube means for causing said tube means to fire for a greater or lesser portion of each current cycle depending upon the instantaneous value of said control voltage.

2. For use with polyphase alternating-current induction motors and the like; control means comprising reactors interposed in each phase of the motor current-supply, means for producing a stable reference voltage, means for producing a sensory voltage, the value of which varies responsive to the variation in speed of the motor means for combining said reference and sensory voltages whereby to produce a control voltage which is the algebraic sum of the reference and sensory voltages, a resistance and a capacitance connected across each reactor, an electron tube means for each reactor, said electron tube means having a plate-to-cathode circuit and a grid-to-cathode circuit, the reactor associated with each tube means being series connected in the plate-to-cathode circuit, said capacitance being series connected in the grid-to-cathode circuit, and the control voltage being impressed upon the grid of each tube means for causing said tube means to fire for a greater or lesser portion of each current cycle depending upon the instantaneous value of said control voltage.

3. For use with polyphase alternating-current induction motors and the like; speed control means comprising reactors each having a primary and secondary winding, each primary winding being interposed in one phase of the motor current-supply, a tachometer generator mechanically connected to the motor adapted to generate a tachometer voltage which fluctuates responsive to variation in speed of the motor, a source of stable reference voltage means for imposing said reference voltage upon the tachometer voltage whereby to produce a control voltage which is the algebraic sum of said tachometer and reference voltages, a resistance and a capacitance connected across each secondary winding, an electron tube means for each reactor, said tube means having a plate-to-cathode circuit and a grid-to-cathode circuit, the secondary winding of the reactor associated with the tube means being series connected in the plate-to-cathode circuit, said capacitance and a grid resistor connected in the grid-to-cathode circuit, and the control voltage being impressed upon the grid resistor of each such tube whereby to cause the tubes to fire for greater or lesser portion of each current cycle depending upon the instantaneous value of the control voltage.

4. For use with polyphase alternating-current induction motors and the like; speed control means comprising reactors interposed in each phase of the motor current-supply, a tachometer generator mechanically connected to the motor adapted to generate a tachometer voltage which fluctuates responsive to variation in speed of the motor, a source of stable reference voltage means for imposing said reference voltage upon the tachometer voltage whereby to produce a control voltage which is the algebraic sum of said tachometer and reference voltages, a resistance and a capacitance connected across each reactor, an electron tube means for each reactor, said tube means having a plate-to-cathode circuit and a grid-to-cathode circuit, the reactor associated with the tube means being series connected in the plate-to-cathode circuit, said capacitance being series connected to the grid-to-cathode circuit, and the control voltage being impressed upon the grid of each such tube whereby to cause the tubes to fire for greater or lesser portion of each current cycle depending upon the instantaneous value of the control voltage.

5. For use with polyphase alternating-current induction motors and the like; speed control means comprising reactors having a primary winding interposed in each phase of the motor current-supply, each reactor also having a second winding, a tachometer generator mechanically connected to the motor adapted to generate a tachometer voltage which fluctuates responsive to variation in speed of the motor, a source of stable reference voltage means for imposing said reference voltage upon the tachometer voltage whereby to produce a control voltage which is the algebraic sum of said tachometer and reference voltages, a resistance and a capacitance connected across each secondary winding, an electron tube means for each reactor, said tube means having a plate-to-cathode circuit and a grid-to-cathode circuit, the secondary winding of the reactor associated with the tube means being series connected in the plate-to-cathode circuit, said capacitance also being series connected in the grid-to-cathode circuit, and the control voltage being impressed upon the grid of each such tube whereby to cause the tubes to fire for greater or lesser portion of each current cycle depending upon the instantaneous value of the control voltage.

6. For use with polyphase alternating-current induction motors and the like; speed control means comprising reactors having a primary winding interposed in each phase of the motor current-supply, each reactor also having a secondary winding, a tachometer generator mechanically connected to the motor adapted to generate a tachometer voltage which fluctuates responsive to variation in speed of the motor, a source of stable reference voltage means for imposing said reference voltage upon the tachometer voltage whereby to produce a control voltage which is the algebraic sum of said tachometer and reference voltages, a capacitance connected across each secondary winding, an electron tube means for each reactor, said tube means having a plate-to-cathode circuit and a grid-to-cathode circuit, the secondary winding of the reactor associated with the tube means being series connected in the plate-to-cathode circuit, said capacitance also being series connected in the grid-to-cathode circuit, and the control voltage being impressed upon the grid of each such tube whereby to cause the tubes to fire for greater or lesser portion of each current cycle depending upon the instantaneous value of the control voltage.

7. For use with polyphase alternating-current induction motors and the like; control means comprising reactors interposed in each phase of the motor current-supply, means for producing a stable reference voltage, means for producing a sensory voltage, the value of which varies responsive to the variation in torque of the motor means for combining said reference and sensory voltages whereby to produce a control voltage which is the algebraic sum of the reference and sensory voltages, a resistance and a capacitance connected across each reactor, an electron tube means for each reactor, said electron tube means having a plate-to-cathode circuit and a grid-to-cathode circuit, the reactor associated with each tube means being series connected in the plate-to-cathode circuit, said capacitance being series connected in the grid-to-cathode circuit, and the control voltage being impressed upon the grid of each tube means for causing said tube means to fire for a greater or lesser portion of each current cycle depending upon the instantaneous value of said control voltage.

8. For use with polyphase alternating-current induction motors and the like; speed control means comprising reactors each having a primary winding and a secondary winding, each primary winding being interposed in one phase of the motor current-supply, torque sensing means mechanically connected to the motor and adapted to generate a voltage which fluctuates responsive to variation in torque of the motor, a source of stable reference voltage means for imposing said reference voltage upon the torque responsive voltage whereby to produce a control voltage which is the algebraic sum of said torque responsive and reference voltages, a resistance and a capacitance series connected across each secondary winding, an electron tube means for each reactor, said tube means having a plate-to-cathode circuit and a grid-to-cathode circuit, the secondary winding of the reactor associated with the tube means being connected in the plate-to-cathode circuit, said capacitance being series connected in the grid-to-cathode circuit, and the control voltage being impressed upon the grid of each such tube whereby to cause the tubes to fire for greater or lesser portion of each current cycle depending upon the instantaneous value of the control voltage.

References Cited in the file of this patent

UNITED STATES PATENTS

| | | |
|---|---|---|
| 2,462,751 | Koehler | Feb. 22, 1949 |
| 2,568,701 | Arnold | Sept. 25, 1951 |
| 2,676,292 | Spencer | Apr. 20, 1954 |
| 2,695,982 | Soller et al. | Nov. 30, 1954 |